United States Patent [19]

Albright

[11] Patent Number: 4,479,628
[45] Date of Patent: Oct. 30, 1984

[54] FISHING ROD HOLDER

[76] Inventor: Ronald G. Albright, 2811 Seventh St., SW., Canton, Ohio 44710

[21] Appl. No.: 353,614

[22] Filed: Mar. 1, 1982

[51] Int. Cl.³ ............................................. A45F 3/44
[52] U.S. Cl. .................................. 248/530; D22/13; 43/21.2; 248/156
[58] Field of Search ............... 248/530, 532, 533, 534, 248/156, 85, 86, 87, 111, 67.7; D22/13; 211/60 R; 43/21.2

[56] References Cited

U.S. PATENT DOCUMENTS

| D. 190,330 | 5/1961 | Carothers | D31/4 |
| D. 202,432 | 9/1965 | Turlace | D31/4 |
| 440,727 | 11/1890 | Sheafe | 248/530 |
| 2,059,921 | 5/1936 | Weiss | 248/530 |
| 2,202,739 | 5/1940 | Kilby | 248/530 |
| 2,492,323 | 12/1949 | Roell | 248/533 |
| 2,652,999 | 9/1953 | Lohmar | 248/530 |
| 2,752,115 | 6/1956 | Green | 248/533 |
| 2,856,144 | 10/1958 | Plater | 248/533 |
| 3,530,611 | 9/1970 | Britt | 248/530 |
| 3,612,455 | 10/1971 | Cole et al. | 248/530 |
| 3,858,833 | 1/1975 | Fink | 248/530 |
| 4,007,902 | 2/1977 | Pettee | 248/530 |
| 4,116,302 | 7/1979 | Stuhlman | 248/156 |

FOREIGN PATENT DOCUMENTS 2038974 7/1980 United Kingdom ................. 248/87

Primary Examiner—William H. Schultz
Assistant Examiner—Ramon O. Ramirez
Attorney, Agent, or Firm—Michael Sand Co.

[57] ABSTRACT

An integral one-piece fishing rod holder having a Y-shaped configuration formed by an elongated stake adapted to be inserted generally vertically into the ground and a pair of arms extending upwardly outwardly from a junction zone formed by the upper end of the stake and arms. An elongated vertically extending slot is formed in the junction zone of the Y-shaped holder for receiving and supporting a portion of a fishing rod therein. A curved passage is formed in the junction zone and extends partially along one of the arms and communicates with the elongated slot below the top of the slot. The passage and slot form a downwardly extending projection in the junction zone which retains the rod within the slot if a force is applied to the fishing rod when the rod is unattended. A curved notch is formed in the top edge of the junction zone to provide a casual support for the fishing rod when attended by a fisherman. A hole is formed in the junction zone beneath the elongated slot for attachment of a fish stringer or net.

11 Claims, 6 Drawing Figures

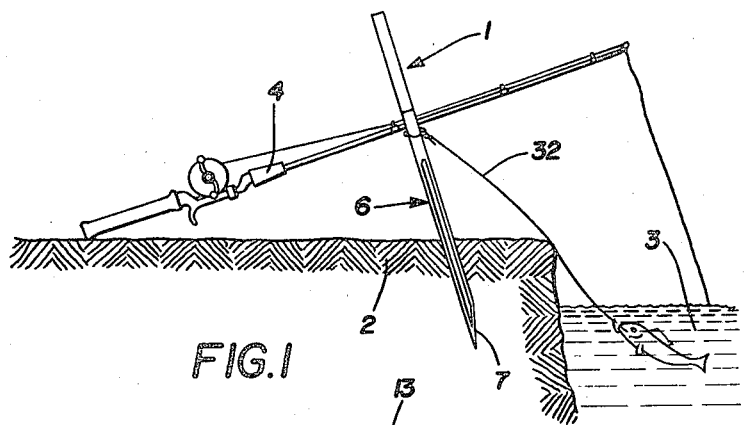
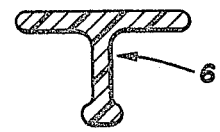
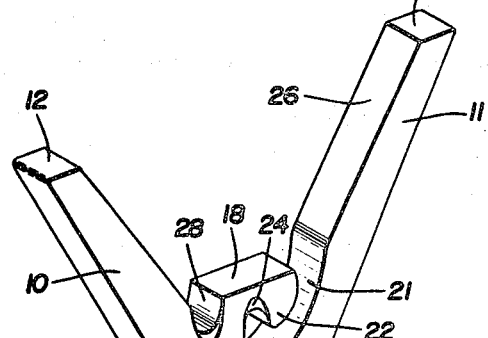
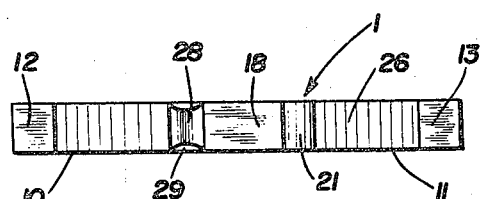
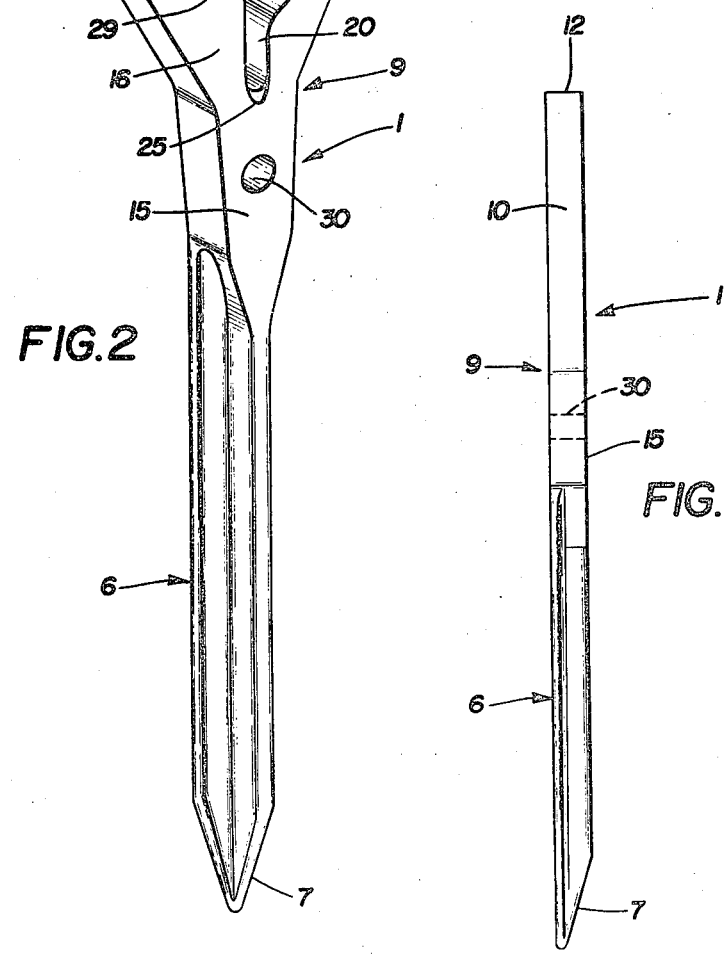
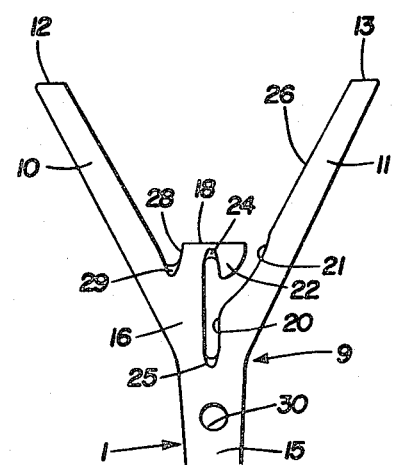

FISHING ROD HOLDER

BACKGROUND OF THE INVENTION

1. Field of the Invention

The invention relates to a support for a fishing rod which can be used on the bank of a body of water, or mounted on a boat, pier, etc. More particularly, the invention relates to a support for a fishing rod which has a compact and rugged construction and which has retaining means to prevent accidental loss of the rod if the hook is taken by a fish when the rod is left unattended by a fisherman.

2. Description of the Prior Art

There have been numerous types and styles of devices for holding fishing rods while the line and hook are in the water to relieve the fisherman of the continuous and tedious task of holding the rod. Many of these prior devices are provided with means for embedding the device in the bank of a river, lake or stream, with the upper portion of the device being adapted to support a portion of the rod therein with the handle of the rod resting on the ground adjacent to and rearward of the rod-holding device.

Although many of these prior devices function satisfactorily for their intended purpose, they are usually constructed of several individual components which are attached together to form the completed device. Also, these prior devices usually are formed of metal which is subject to rust and corrosion due to the continuous contact with or being adjacent to water and being stored in damp tackle boxes or the like. Also, many of these devices contain movable parts which are subject to breakage and loss, rendering the device inoperative. Some examples of these prior devices are shown in U.S. Pat. Nos. 190,330 and 202,432, and in U.S. Pat. Nos. 440,727, 2,059,921, 2,202,739, 2,652,999, 3,612,455, 3,858,833 and 4,007,902.

Many of these prior devices use a U-shaped or similar member on which the fishing rod is supported. However, should the rod be left unattended and a fish take the hook and run, the rod will be pulled out of the device or become disengaged and be pulled into the water and lost. Such devices require that the fisherman stay in close proximity to the supported rod at all times to prevent accidental loss of the rod.

There is no known rod-holding device of which I am aware which incorporates the unique feature of a "rod saver slot" arrangement which enables the rod to be left unattended, whereby even if a fish grabs the hook and runs, the device will prevent the rod from being pulled into the water, and in which no moving parts are required to so retain the rod in its secured position, and in which the device is formed of an integral one-piece member free of any movable parts which are subject to loss or breakage.

SUMMARY OF THE INVENTION

Objectives of the invention include providing an improved fishing rod holder device which is formed as an integral one-piece member, preferably of plastic, which is unaffected by the water and moisture to which most fishing articles are exposed and thereby is free of rust; and in which the device is extremely strong and durable and can be stored in a tackle box without becoming entangled with other fishing articles contained therein and which is free of any movable parts that are subject to breakage or loss. Another object is to provide such a device which has a unique "rod saver slot" which receivably supports a portion of the fishing rod so that the rod will not be dislodged accidently from the device if a fish grabs the hook and runs even if the rod is left unattended.

Another objective of the invention is to provide such a rod holder device which is provided with a "casual notch" in which the rod can be supported when attended by the fisherman not requiring use of the "rod saver slot" to permit greater and more rapid movement of the rod upon a fish beginning to take the bait, and in which the device can be used equally satisfactorily by a right- or left-handed fisherman simply by turning the device 180° before inserting the same into the ground or placing it in a mounting bracket on a boat or dock. A still further objective is to provide such a device which has an attachment point for securing a fish stringer or basket to the device to provide a means for securely anchoring a fisherman's catch while he is fishing.

Another objective of the invention is to provide such a device which is extremely rugged and durable in construction, which can be manufactured at a relatively inexpensive cost, which is free of sharp metal parts and corners that can cut a fisherman or damage other equipment in a tackle box, and which eliminates difficulties existing in the art, satisfies needs and obtains new results.

These objectives and advantages are obtained by the improved fishing rod holder, the general nature of which may be stated as including an integral one-piece Y-shaped member having an elongated stake at one end for mounting said member in a generally vertical position and a pair of arms extending upwardly outwardly from an opposite end of said member, said stake and arms merging into and forming a junction zone; and slot means formed in the junction zone of the Y-shaped member for receiving and supporting a portion of a fishing rod therein, said slot means forming retaining means in said junction zone whereby a fishing rod when inserted into the slot means and supported by the junction zone is prevented from being prematurely dislodged by an unexpected force on the fishing pole from the holder by the retaining means.

BRIEF DESCRIPTION OF THE DRAWING

A preferred embodiment of the invention, illustrative of the best mode in which applicant has contemplated applying the principles, is set forth in the following description and shown in the accompanying drawing, and is particularly and distinctly pointed out and set forth in the appended claims.

FIG. 1 is a diagrammatic perspective view of the improved fishing rod holder shown installed in the ground adjacent the river bank holding a fishing rod;

FIG. 2 is an enlarged perspective view of the fishing rod holder shown in FIG. 1;

FIG. 3 is a reduced front elevational view of the rod holder shown in FIG. 2;

FIG. 4 is a left-hand end view of the rod holder shown in FIG. 3;

FIG. 5 is an enlarged top plan view of the rod holder as shown in FIGS. 3 and 4; and FIG. 6 is an enlarged fragmentary sectional view taken on line 6—6, FIG. 3.

Similar numerals refer to similar parts throughout the drawing.

DESCRIPTION OF THE PREFERRED EMBODIMENT

The improved rod holder is indicated generally at 1 and is shown in FIG. 1 being embedded in the ground 2 adjacent the bank of a river 3 and holding a fishing rod 4 in a supported position thereon. Rod holder 1 is an integral, one-piece Y-shaped member (FIGS. 2 and 3) preferably molded of plastic, although the same could be formed of wood, metal or other rigid material. Rod holder 1 includes an elongated bottom stake portion 6 having a lower pointed end 7 to facilitate the insertion of holder 1 into the ground in a generally vertical position, as shown in FIG. 1. Stake portion 6 may have a T-shaped cross-sectional configuration, as shown in FIG. 6, to provide a rigid member with a minimum amount of material. Although this cross-sectional configuration can be varied without affecting the concept of the invention, it provides a configuration having sufficient rigidity and strength with a minimum amount of material.

Stake portion 6 terminates at its upper end in a junction zone 9 which is integrally connected with a pair of upwardly outwardly extending arms 10 and 11. Arms 10 and 11 may be slightly tapered in width and preferably terminate in flat upper edges 12 and 13, respectively. Junction zone 9 includes a generally rectangularly shaped lower portion 15 which merges with stake portion 6, and an upper portion 16 which merges and blends into arms 10 and 11. A flat horizontal top surface or edge 18 extends across the top of junction zone 9 between the bases of arms 10 and 11.

Arms 10 and 11 preferably form an included angle of approximately 55° therebetween and in addition to assisting in supporting and retaining a fishing rod 4 therein, as described below, they also assist and provide handles on which force may be applied to embed holder 1 into ground 2 when installing the same. Flat top surface 18 of junction zone 9 also provides another area on which a downward installation force can be applied.

In accordance with one of the main features of the invention, a rod saver or retaining slot 20 is formed in junction zone 9 and extends vertically therein. A curved passage 21 is formed in junction zone 9 and partially in a portion of arm 11 and communicates with rod slot 20 a short distance below the top of slot 20. Slot 20 and passage 21 form a downwardly extending projection 22 which assists in retaining fishing rod 4 in slot 20 when an unexpected force is applied to the rod. The top and bottom ends of slot 20 are beveled at 24 and 25, respectively, on both sides of slot 20. The beveled bottom ends 25 provide an area of rest for the supported portion of fishing rod 4 therein and conforms to the cylindrical shape of most fishing rods.

The particular arrangement of vertical slot 20 and curved passage 21 and the resulting formation of projection 22 enables rod 4 to be supported on bottom beveled portion 25 and left unattended by the fisherman without the danger of the rod being accidentally or prematurely being pulled into the water by a fish. A pull on the rod would merely slide the rod upwardly through slot 20 until the eyelet of handle of the rod engages the edges of slot 20 and projection 22. It would be extremely difficult for such a force to remove the rod from slot 20 through curved passage 21, yet this configuration enables rod 4 to be inserted easily into slot 20 and beyond projection 22 through passage 21. Thus, a fisherman while leaving his rod unattended merely places it into slot 20 through curved passage 21 with the rod resting on bottom beveled end 25 of slot 20. Also, the rod is guided easily into passage 21 by its sliding downwardly along inner surface 26 of arm 11.

If desired, the fisherman can rest the rod within another notch 28 which is formed in horizontal edge 18. Notch 28 also has a beveled end 29 against which the rod will rest and be supported thereby. Notch 28 is formed mainly in top edge 18 of junction zone 9 at the merger with arm 10 and may extend partially into the lower portion of arm 10, as shown in FIGS. 2 and 3. A circular hole 30 is formed in lower portion 15 of junction 9 and extends in a transverse direction completely through holder 1 to provide an attachment point for a fish stringer 32, a fishing net or the like, as shown in FIG. 1.

Accordingly, rod holder 1 incorporates several unique features such as notch 28 which provides a casual support for a fishing rod while attended by the fisherman which enables complete freedom of pole movement by the fisherman, and slot 20 which provides a support for the rod which prevents accidental loss of the pole by a fish being hooked on the rod end even if left unattended. Also, arms 10 and 11, in addition to providing guides and partial supports for a fishing rod when resting in notch 28 and being channeled into slot 20 through passage 21 provide a handle for inserting rod holder 1 into the ground, which is facilitated by the pointed end 7 of stain portion 6. Also, hole 30 enables a fish stringer or the like to be secured to holder 1 during use thereof.

A fisherman by applying a downward force on arms 10 and 11 and on flat horizontal top edge 18 forces pointed end 7 of stake 6 into the ground a sufficient distance to securely anchor holder 1 therein. The depth of penetration of stake 6 will depend upon the firmness of the soil into which it is inserted. The fisherman then can either rest his pole 4 in casual notch 28 or in the rod saver slot 20.

Another advantage of holder 1 is that it can be used equally well by a right- or left-handed fisherman simply by turning holding 1 180°. This allows the rod to be slipped into and out of rod saver slot 20 on either the right or left, since curved passage 21 will assume either a right- or left-hand position depending upon the position that holder 1 is inserted into the ground. Furthermore, rod holder 1 is formed as an integral one-piece member free of any movable parts that are subject to loss or breakage and can be formed inexpensively of injection-molded plastic or other rigid material such as wood, metal or the like.

As an example, holder 1 may have an overall vertical length of approximately 18 inches with the horizontal separation between the outer ends of arms 10 and 11 being 7½ inches, and the vertical length of slot 20 being approximately 2 inches, with the other components being dimensioned proportionately, as shown in the drawing. However, these dimensions can vary without affecting the concept of the invention and are being set forth for illustrative purposes only.

Accordingly, improved rod holder is simplified, provides an effective safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding, but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved fishing rod holder is constructed and used, the characteristics of the construction, and the advantageous, new and useful results obtained; the new and useful structures, devices, elements, arrangements, parts, and combinations, are set forth in the appended claims.

I claim:

1. A fishing rod holder including:
   (a) an integral one-piece Y-shaped member having an elongated stake at one end for mounting said member in a generally vertical position and a pair of arms extending upwardly outwardly from an opposite end of said member, said stake and arms merging into and forming a junction zone; and
   (b) slot means formed in the junction zone of the Y-shaped member for receiving and supporting a portion of a fishing rod therein, said slot means forming retaining means in said junction zone whereby a fishing rod when inserted into the slot means and supported by the junction zone is prevented by the retaining means from being prematurely dislodged from the holder by an unexpected force on the fishing pole, said slot means includes a vertically extending slot and a downwardly inwardly extending passage communicating with the slot beneath an upper end thereof, with the slot and passage forming a projection which provides the rod retaining means.

2. The holder defined in claim 1 in which the Y-shaped member is molded of plastic.

3. The holder defined in claim 1 in which a hole is formed transversely through the junction zone beneath the slot means to provide an attachment location for a fish stringer or net.

4. The holder defined in claim 1 in which the stake has a generally T-shaped horizontal cross-sectional configuration.

5. The holder defined in claim 1 in which the stake has a lower pointed end for facilitating the insertion of the rod holder into the ground.

6. The holder defined in claim 1 in which the junction zone has a horizontal upper edge extending between the arms; and in which a curved notch is formed in said horizontal upper edge to provide an alternate support for a portion of a fishing rod.

7. The holder defined in claim 1 in which the vertical height of the Y-shaped member is approximately 18 inches and the horizontal spacing between the outer end of the arms is $7\frac{1}{2}$ inches.

8. The holder defined in claim 1 in which the arms form an included angle of approximately 55° therebetween.

9. The holder defined in claim 1 in which the curved passage extends partially along one of the arms and into the junction zone for communicating with the elongated slot.

10. The holder defined in claim 1 in which the slot is approximately 2 inches in length.

11. The holder defined in claim 1 in which the bottom end of the slot is beveled.

* * * * *